United States Patent [19]

Otruba et al.

[11] Patent Number: 5,772,001
[45] Date of Patent: Jun. 30, 1998

[54] STAR WHEEL SYSTEM

[75] Inventors: Svatoboj Otruba, Ceres; Joseph Parker, Turlock; Gary Gomes, Winton, all of Calif.

[73] Assignee: B & H Manufacturing Company, Inc., Ceres, Calif.

[21] Appl. No.: 634,653

[22] Filed: Apr. 18, 1996

[51] Int. Cl.⁶ .................................................. B65G 47/26
[52] U.S. Cl. ................................... 198/459.2; 198/480.1; 198/481.1
[58] Field of Search ............................. 198/478.1, 479.1, 198/480.1, 481.1, 459.2

[56] References Cited

U.S. PATENT DOCUMENTS

| | | | |
|---|---|---|---|
| 3,557,933 | 1/1971 | Sopher | 198/459.2 X |
| 5,082,105 | 1/1992 | Tincati | 198/480.1 X |
| 5,533,608 | 7/1996 | Adams et al. | 198/480.1 X |

FOREIGN PATENT DOCUMENTS

| | | | |
|---|---|---|---|
| 0075322 | 3/1989 | Japan | 198/481.1 |
| 4173619 | 6/1992 | Japan | 198/481.1 |

*Primary Examiner*—James R. Bidwell
*Attorney, Agent, or Firm*—Janet E. Muller; Flehr Hohbach Test Albritton & Herbert

[57] ABSTRACT

A machine and method for handling a plurality of articles, and a feed apparatus for transporting the article between a first station and a second station. The machine generally includes a conveyor which supplies a stream articles to an infeed station and a feed apparatus for indexing the articles. The feed apparatus includes at least one pocket shaped to at least partially receive one of the articles for transport the article from the first station to the second station and a guide section configured to separate the first one of the articles from the second one of the articles for movement of the first one of the articles into the pocket, to control movement of the second one of the articles during separation of the first one of the articles from the second one of the articles, and to move the second one of the articles into the pocket upon further rotation of the feed apparatus. The method includes the steps of moving a plurality of articles to the first station in a substantially continuous stream and rotating the feed wheel to separate adjacent articles and individually move the articles from the infeed station to the exit station.

25 Claims, 4 Drawing Sheets

STAR WHEEL SYSTEM

BRIEF DESCRIPTION OF THE INVENTION

This invention relates in general to a feed apparatus for transporting containers and other articles through a machine and, more particularly, to an improved star wheel.

BACKGROUND OF THE INVENTION

In many labeling machines, a container feed such as a rotary star wheel transport the containers in a curved path past a rotating vacuum drum which carries labels from a label feed. The operation of the star wheel and vacuum drum are synchronized so that a label is accurately applied to the exterior of each container during rotation of the star wheel and the vacuum drum. An example of such labeling machine is disclosed in U.S. Pat No. 4,181,555.

The containers are typically supplied in a substantially continuous stream with guide rails arranging the containers in a line. Prior to reaching the star wheel, the continuous stream is interrupted to introduce a predetermined spacing between each container. Examples of such mechanisms include gates, feed screws, and in-feed star wheels with narrow pointed arms which are forced between the adjacent containers. Although feed screws introduce the desired spacing between successive containers, an in-feed star wheel often must also be used to adjust the delivery path of the containers. Although such devices generally provide the star wheel with the desired container distribution, the infeed stars limit the maximum speed which may be attained with the machine to about 400 to 500 containers per minute and the feed screws are mechanically complex and difficult to manufacture. The devices increase the complexity and cost of manufacturing and operating the machine, and must be adjusted to conform to the timing of the other components of the machine. A labeling machine which eliminates the need for gates, feed screws, in-feed star wheels and other such components is desirable.

Labeling machines available in the art are often used to apply labels to containers of different sizes. However, this involves major adjustments to the machine. Typically, the container feed, infeed star wheel, feed screw and vacuum drum must be replaced with components which are specifically tailored to the new container size. The location of the container feed must also be moved so that the exterior of the container will contact the label as it is carried along the curved path by the container feed, require additional adjustment and calibration of the machine. Thus, converting the machine to accommodate different size containers is a time consuming and labor intensive process. A machine with a container feed which may be mounted at the same location relative to the other components for containers of different sizes is desirable.

OBJECTS AND SUMMARY OF THE INVENTION

It is an object of the present invention to provide an improved machine and method for applying labels or other material segments to containers or other articles.

It is another object of the present invention to provide a star wheel which eliminates the need for gates, in-feed stars, feed screws and the like.

It is yet another object of the present invention to provide a machine with a feed apparatus which separates the first article or container from a line of articles and moves the first article from an infeed station to an exit station.

It is a further object of the present invention to provide a labeling machine in which the container feed is mounted at the same location for containers of different sizes.

A more general object of the present invention is to provide a machine which may efficiently manufactured, assembled, operated and maintained, and which may be operated at high speeds.

In summary, the invention provides a machine and method for applying a segment of material to an exterior surface of an article, and a feed apparatus for transporting the article between a first station and a second station. The machine generally includes a conveyor, a rotary disc, and a segment application device. The conveyor supplies a stream of a plurality of articles to a first station with a first article positioned directly in front of and in contact with a second article and the second article positioned directly in front of and in contact with a third article. The rotary disc individually moves the articles from the first station to a second station downstream of the first station with the rotary disc successively separating the first article from the second article and moving the first article to the second station.

The method includes the steps of moving a plurality of articles to the first station in a substantially continuous stream, rotating a wheel having a plurality of contoured arms relative to the first station to individually move the articles from a first station to a second station downstream of the first station. Each of the contoured arms has leading surface which defines a pocket shaped to partially receive one of the articles and a cam surface. The cam surface of one of the contoured arms guides the first article into the pocket defined by the leading surface of an adjacent arm and the leading surface of the adjacent arm moves the first article toward the second station. The method also includes the step of applying a segment of material to the exterior surface of each of the articles.

The feed apparatus of this invention, which is for indexing a plurality of articles between an infeed station and an exit station where the articles are delivered to the infeed station in a substantially continuous stream with a first article positioned directly in front of and in contact with a second article. The feed apparatus includes at least one rotary wheel having a plurality of contoured arms. Each arm has a leading surface which defines a pocket shaped to partially receive one article to move the article from the infeed station to the exit station. Each of the contoured arms also have a cam surface which is shaped to separate the second article from the first article when the first article is moved into the pocket of one arm and, upon further rotation of the wheel, to guide the second article into the pocket defined by the leading surface of an adjacent contoured arm.

Additional objects and features of the invention will be more readily apparent from the following detailed description and appended claims when taken in conjunction with the drawings.

BRIEF DESCRIPTION OF THE DRAWINGS

The foregoing and other objects of the invention will be more readily apparent from the following detailed description and appended claims when taken in conjunction with the drawings of which:

DETAILED DESCRIPTION OF THE INVENTION

Reference will now be made in detail to the preferred embodiment of the invention, which is illustrated in the accompanying figures. Turning now to the drawings, wherein like components are designated by like reference numerals throughout the various figures, attention is directed to FIG. 1.

Figure 1:
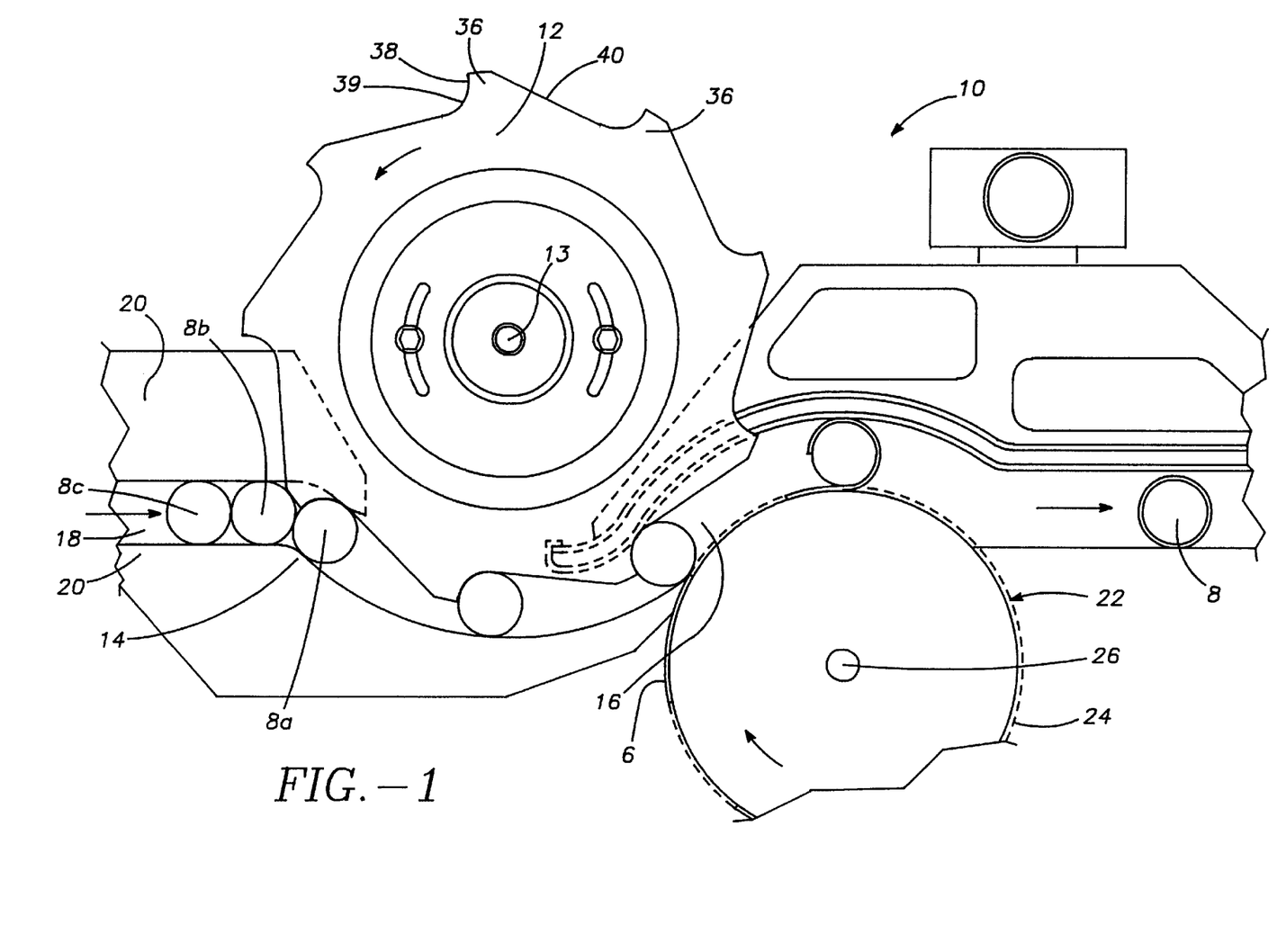
FIG. 1 is a schematic, plan view of a machine having a feed apparatus in accordance with this invention.

FIG. 1 schematically shows a labeling machine 10 for applying labels 6 to the exterior of containers 8 which incorporates the feed apparatus or star wheel 12 of this invention. Although the feed apparatus 12 is described in relation to the application of labels to a container, it is to be understood that this invention is not limited to this application. On the contrary, the feed apparatus 12 may be employed in any application where containers are individually separated from a stream of containers. For example, the feed apparatus 12 may be used to transfer containers to a filling machine or capping machine. Similarly, the feed apparatus 12 is not limited to indexing containers but may be used with other articles. For example, the feed apparatus 12 may be used to transfer articles to a machine which applies segments of decorative material to the exterior of the articles, or in any manufacturing or processing line where it is necessary to separate the containers and individually transfer the containers from a first location to a second location. The articles may be cylindrical, convex or another shape and may have circular, oval, rectangular or other cross sectional shapes.

The feed apparatus or star wheel 12, which rotates about axis 13, separates the containers 8 and individually transports the containers in a curved path between an infeed station 14 and an exit station 16. Although not shown, the labeling machine 10 preferably includes two vertically spaced star wheels as is known in the art. The two star wheels 12, which are identical, engage the container proximate the upper and lower ends, distributing the forces applied to the container and leaving the central portion exposed so that the label may be applied without interference from the star wheel. However, it is to be understood that the number of star wheels employed is subject to considerable variation within the scope of this invention. The containers 8 are delivered to the infeed station 14 in a substantially continuous stream by a conveyor 18. In this modification of the invention, conveyor 18 is a conveyor belt which supports the containers 8 although other means as for example rollers or one or more belts which engage the side wall of the containers may be used to move the containers to the infeed station 14. The conveyor 18 may also be a static trackway with the forward motion being created as additional containers are moved onto the conveyor. Guide rails 20 direct the containers 8 in a single-file line to the infeed station. Preferably, the path defined by the guide rails 20 is curved so that direction of container movement at the infeed station 14 is tangential to the feed apparatus at the point of contact.

The star wheel 12 moves the containers past a label application assembly 22. In this embodiment, the label application assembly 22 includes a vacuum drum feed 24 rotating with a shaft 26 and having projecting pads or lands (not shown). The labels 6 are adhered to the pads of the drum 24 by a vacuum. An example of vacuum drum feeds of this type, which are well known, is shown in U.S. Pat. No. 3,834,963. Various delivery systems are used in the art to deliver the labels 6 to the vacuum drum feed 24, any of which may be employed with the label application assembly 22. One or more rollers (not shown) may be used to smooth and more securely and evenly seal the label to the container after it has been applied by the vacuum drum feed 24.

In accordance with this invention, star wheel 12 separates the first container 8a located at the infeed station 14 from the second container 8b and moves the container 8a in a curved path toward the exit station 16. Components such as an in-feed star wheel, feed screw and gates are not required with this machine. As is shown particularly in FIGS. 1 and 2, in the illustrated embodiment the star wheel 12 includes a plurality of circumferentially spaced contoured arms 36. Each arm includes a leading surface 38 which defines a pocket 39 shaped to receive the container 8 and carry the container from the infeed station to the exit station and a cam surface 40. As the star wheel 12 is rotated relative to the infeed station 14, the cam surface 40 initially separates the first container 8a from the second container 8b, and then guides the second container 8b into the pocket 39 of the next adjacent contoured arm 36 without significantly effecting the acceleration or velocity of the third container 8c or any container upstream of the third container 8c.

Any disruption of the flow of containers, beginning with the movement imposed on the third container 8c, will have a magnified effect on the containers upstream of the containers 8a–c potentially causing such problems as creating a container jam or even damaging the equipment upstream of the star wheel 12. Thus, the profile of the cam surface 40 is shaped to control the movement of the third container 8c and all subsequent containers 8d to 8n which are in juxtaposition with container 8c, with the second container 8b acting as both a cam follower in relation to the cam surface 40 and a cam in relation to the third container 8c. In accordance with this invention, the cam surface 40 is provided with a specific profile, depending in part upon the size and cross-sectional shape of the container, which has minimal effect on the average acceleration and velocity of the stream of containers 8. The profile of the cam surface 40 is calculated through a series of equations to move the third container 8c along the guide rails 20 at the desired velocity until it engages the contoured surface 40 of the next adjacent guide wheel.

Figure 3A:
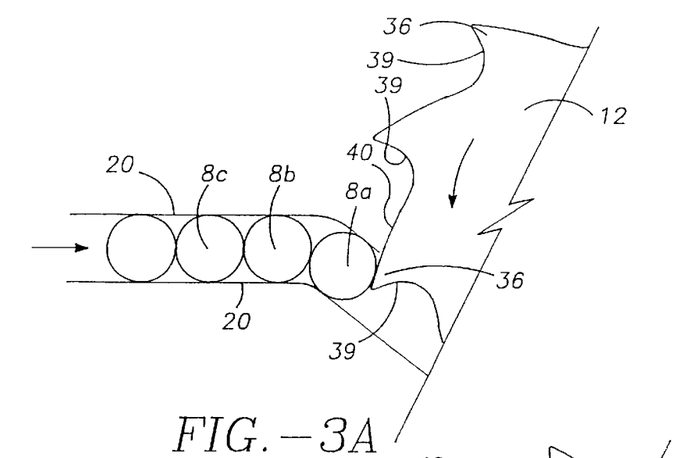
FIGS. 3A–3C are diagrammatic views showing the position of the feed apparatus and articles during one rotation interval of the feed apparatus.
Figure 3B:
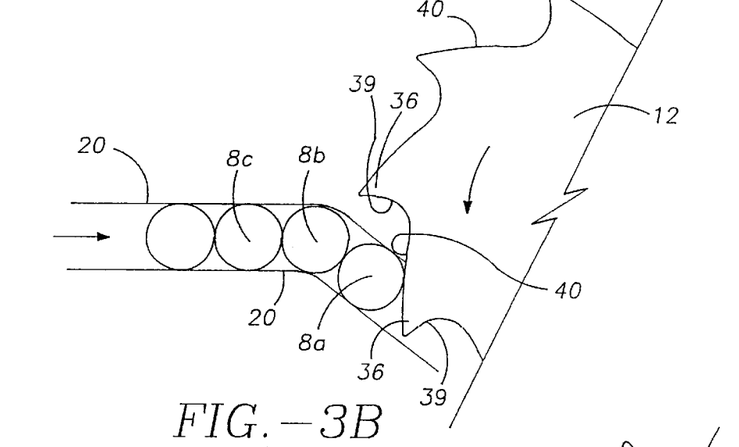
Figure 3C:
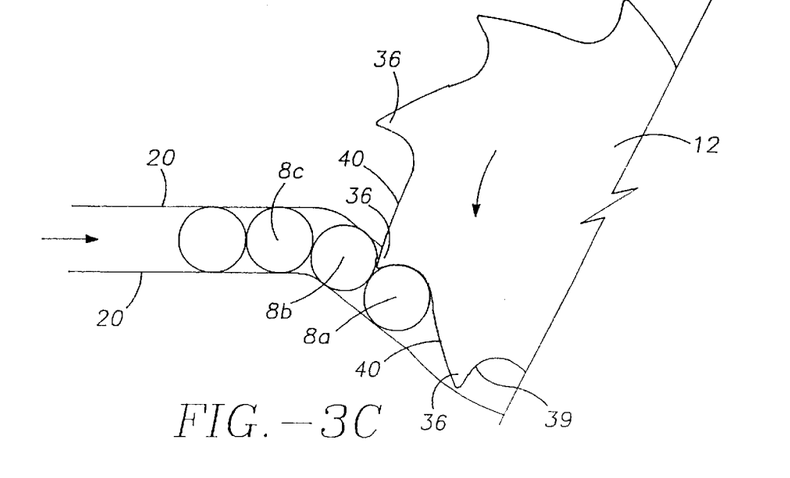

The profile of the cam surface 40 is determined through mathematical analysis of the motion of the containers along the guide rails 20. As is discussed in more detail below, the actual profile of the cam surface is subject to wide appropriate profile of cam surface 40 may be obtained through mathematical analysis using the preferred embodiment as a model. FIGS. 3A–3C schematically illustrate the position of the star wheel 12 and the containers 8a, 8b and 8c at different stages. As the container rotates between the positions of FIGS. 3A and 3C, the cam surface 40 of the contoured arm 36 allows the first container 8a to move forward along a curved path defined by the function $F_1(x,y)$, and the second container 8b is moved along a curved path defined by the function $F_2(x,y)$. The movement of the second container 8b along the path defined by $F_2(x,y)$ is dependent on the movement of the first container 8a along the path $F_1(x,y)$, the geometric relationship between containers 8a and 8b, as well as other factors such as the relative orientation of the containers and the position of the second container 8b along the path $F_2(x,y)$ relative to the first container. This relative position of the second container 8b is represented as $G[F_2(x,y)]$. Thus, the position of the second container 8b relative to the first container 8a is determined by the equation:

$$F_2(x,y) = G[F_2(x,y)] + F_1(x,y)$$

The functions $F_1(x,y)$ and $F_2(x,y)$ are defined by the path of the guide rails 20 near the infeed station 20. For the purposes of this discussion, the focus is on the relative position of the center or axis of each container, not the contacting surfaces.

In the illustrated modification, the containers have a circular cross section. Initially, before container 8a enters the curved stretch of the guide rails 20, the axes of the containers 8a and 8b are separated by a distance $2R_c$, where $R_c$ equals the radius of the container. As the first container 8a is moved along the curved path, the position of the second container 8b may be determined from the equation:

$$\Delta x_2 = G[F_2(x,y)] + \Delta x_1$$

or;

$$\Delta x_2 = 2R_c - \sqrt{(2R_c)^2 - (\Delta y_1)^2} + \Delta x_1$$

where:

$\Delta x_1$ = The distance moved by the first container 8a along the x-axis during a given interval;

$\Delta y_1$ = The distance moved by the first container 8a along the y-axis during the given interval;

The square root of $(2R_c)^2 - (\Delta y_1)^2$ is the distance along the x-axis separating the axes of the containers 8a and 8b; and $2R_c$ is the initial horizontal distance separating the axes of the containers 8a and 8b.

Thus, it is apparent that $G[F_2(x,y)]$ is a function of the cross sectional shape of the container, with containers having circular, elliptical, etc. cross sectional shapes each having a different effect on the movement of the second container 8b over a given interval. For containers of non-cylindrical shape, e.g. convex containers, the analysis focuses on the region of maximum diameter where the contact between adjacent containers occurs.

To illustrate an example of a different shape container, in a container having the cross sectional shape of an ellipse of the form:

$$\frac{x^2}{b^2} + \frac{y^2}{a^2} = 1$$

where "a" is the maximum diameter and "b" is the minimum diameter, the distance separating the centers or axes of the containers depends upon the value of the radius $R_E$ at the point of contact, which changes as the first container 8a travels along a curved path. Assuming that the containers are positioned with their axes of maximum diameter ("a") perpendicular to the direction of travel, the distance along the x-axis separating the axes of the two containers may be determined from the equation:

$$D = 2\sqrt{\left(\frac{4a^2 + 2\Delta y_1 \sqrt{a^2 - b^2}}{4a}\right)^2 - \left(\sqrt{a^2 - b^2} + \frac{\Delta y_1}{2}\right)^2}$$

At the initial position, where $\Delta y_1 = 0$, the distance D separating the containers equals $2b$. After the containers begin to move, the distance separating the axes of the container along the x-axes decreases. This equation is derived by determining the distance L from the maximum diameter axis of the container to the point of contact as follows:

$$L = \sqrt{A^2 - \left(c + \frac{\Delta y_2}{2}\right)^2} = \sqrt{B^2 - \left(c - \frac{\Delta y_2}{2}\right)^2}$$

where A and B are the distances from the focus points of the ellipse to the point of contact and c is distance between the focus point and the center of the ellipse. The equation D may be obtained by substituting $B^2 = (2a - A)^2$ into the above equation and multiplying by a factor of 2.

Thus, for an ellipse:

$$G[F_2(x,y)] = 2b - D =$$

$$2b - 2\sqrt{\left(\frac{4a^2 + 2\Delta y_1 \sqrt{a^2 - b^2}}{4a}\right)^2 - \left(\sqrt{a^2 - b^2} + \frac{\Delta y_1}{2}\right)^2}$$

The function $G[F_2(x,y)]$ may be similarly obtained for containers having other cross-sectional shapes including square containers. It is to be understood that for some shapes, the equation $G[F_2(x,y)]$ may be so complex that it may be desirable to use a numerical approximation instead of actually solving the equation.

Over time, the path of the second container 8b over time may be determined from the following equation:

$$\frac{d}{dt}[F_2(x_2, y_2)] = \frac{d}{dt}[G[F_2(x_1, y_1)] + F_1(x_1, y_1)]$$

Similarly, the motion of a container 8n is:

$$\frac{d}{dt}[F_2(x_n, y_n)] = \frac{d}{dt}[G[F_2(x_{n-1}, y_{n-1})] + F_1(x_{n-1}, y_{n-1})]$$

Thus, the motion of each container is dependent upon the motion of the container directly in front of the container. Because of this dependent motion, any acceleration or deceleration applied by the star wheel 12 to the first container 8a will produce directly proportional acceleration on the containers upstream of the first container. Thus, the velocity of each container relative to the accelerating star wheel 12 remains relatively unchanged.

As the star wheel 12 rotates moving the first container 8a from the leading edge of the cam surface 40 into the pocket 39 of the adjacent contoured arm 36, the containers 8n remote from the star wheel 12 and located in a linear stretch of the guide rails 20 will move forward the distance $C_D$; that is, the distance separating the center axes of the adjacent containers. For circular containers $C_D = 2R_c$ and for elliptical containers positioned with their maximum diameter perpendicular to the direction of travel $C_D = 2b$.

Since the motion of the container 8n is dependent upon the motion of each container in front of the container 8n, the following mathematical model may be obtained:

$$\frac{C_D}{\sigma} = F_1(x_{N-1}, y_{N-1}) + G[F_2(x_N, y_N)] + R(x,y) + S(x,y)$$

where:

$C_D$ is the distance between the axes of adjacent containers, and depends upon the cross-sectional shape of the containers at the point of contact;

$\sigma$ is the angle of rotation of the star wheel 12 for one interval. This angle is a matter of design choice and depends upon the number of pockets 39 of the star wheel;

$F_1(x,y)$, the motion of the first container along the curved path, is dependent upon the shape of the guide rails 20;

$G[F_2(x,y)]$ is dependent upon the motion of the second container relative to the path $F_1(x,y)$ and the relative shape of the containers;

$R(x,y)$ is the motion of the container 8n upstream of and remote from the star wheel 12, which motion is dependent on the motion of the containers between the star wheel and the container 8n; and $S(x,y)$ is the profile of the cam surface 40 of the star wheel 12, which moves the container 8a into the pocket 39 and simultaneously separates the second container 8b from the first container 8a.

Except for $S(x,y)$, the profile of the cam surface 40, all of the components of the above equation are determined by design constraints or the geometric shape of the container.

Figure 2:
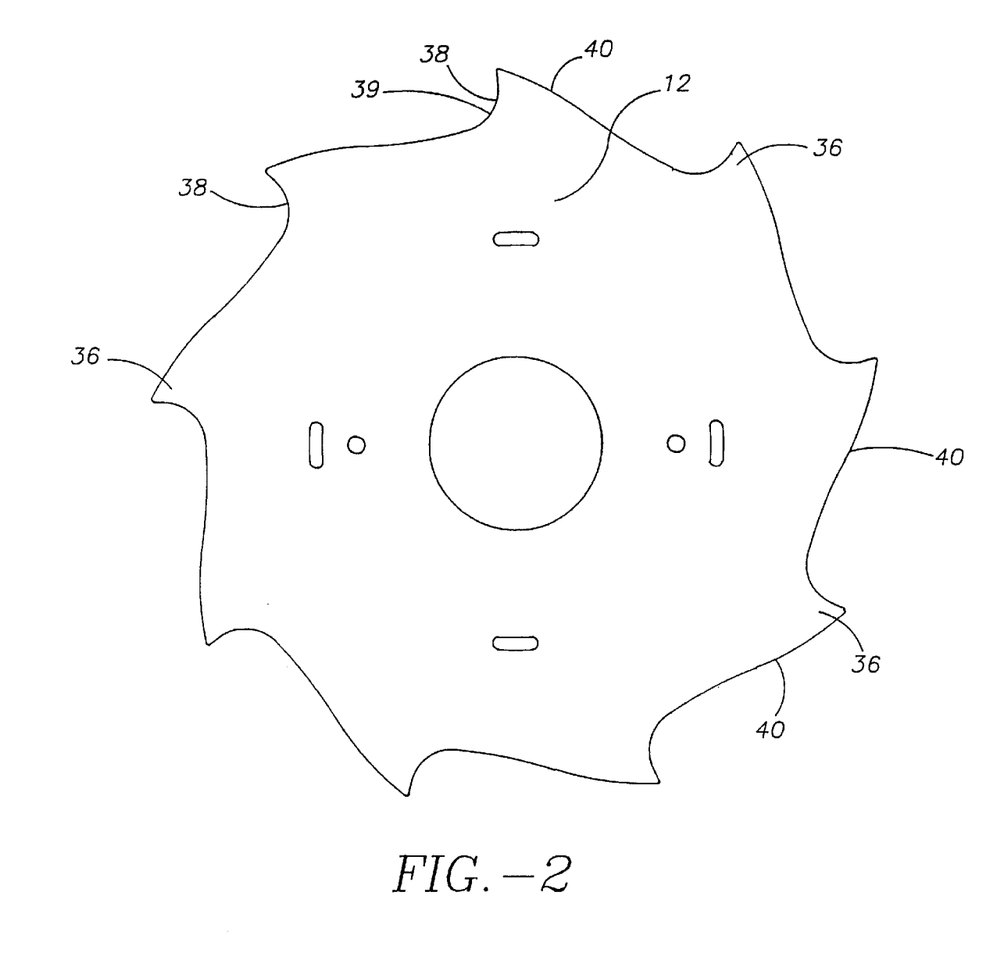
FIG. 2 is a schematic, plan view of a feed apparatus.

In the embodiment shown in FIGS. 1 and 2, the star wheel 12 is used with containers having a circular cross section. The star wheel has nine pockets 39. The guide rails 20 are in the shape of an arc of a circle having a radius $R_G$. The components of the model equation are as follows:

$$C_D = 2R_c$$

$$\sigma = 2\frac{\pi}{9}$$

$$F_1(x,y) = R_G\sin\delta + R_G - R_G\cos\delta$$

$$G[F_2(x,y)] = 2R_c - \sqrt{(2R_c)^2 - (\Delta y_1)^2}$$

$$R(x,y) = 2R_c$$

where $R_G$ is the radius of the guide rail 20 and "$\delta$" is the angle which the container moves along the circumference of the arc defined by $R_G$, or the guide rail. The equation may be solved for $S(x,y)$ directly or through numerical analysis using these known factors to obtain the profile of cam surface 40 shown in FIG. 1.

The profile of the cam surface 40 is dependent in part on the container size, where $R_c$ is the radius of the container. When using the machine for different size containers having the same general shape, the cam surface 40 of the star wheel used with each container size may be determined by substituting the value of $R_c$ for each container into the above equation. As is shown schematically in FIG. 4, the overall diameter of the star wheel 12 changes, increasing to accommodate smaller containers and decreasing to accommodate larger containers. Thus, in accordance with this invention, the pitch diameter of the star wheel, i.e. the distance between the axis of the star wheel 12 and the center axis of the container as the container is carried by the wheel changes, thereby providing a variable pitch star wheel.

Figures 4, 5:
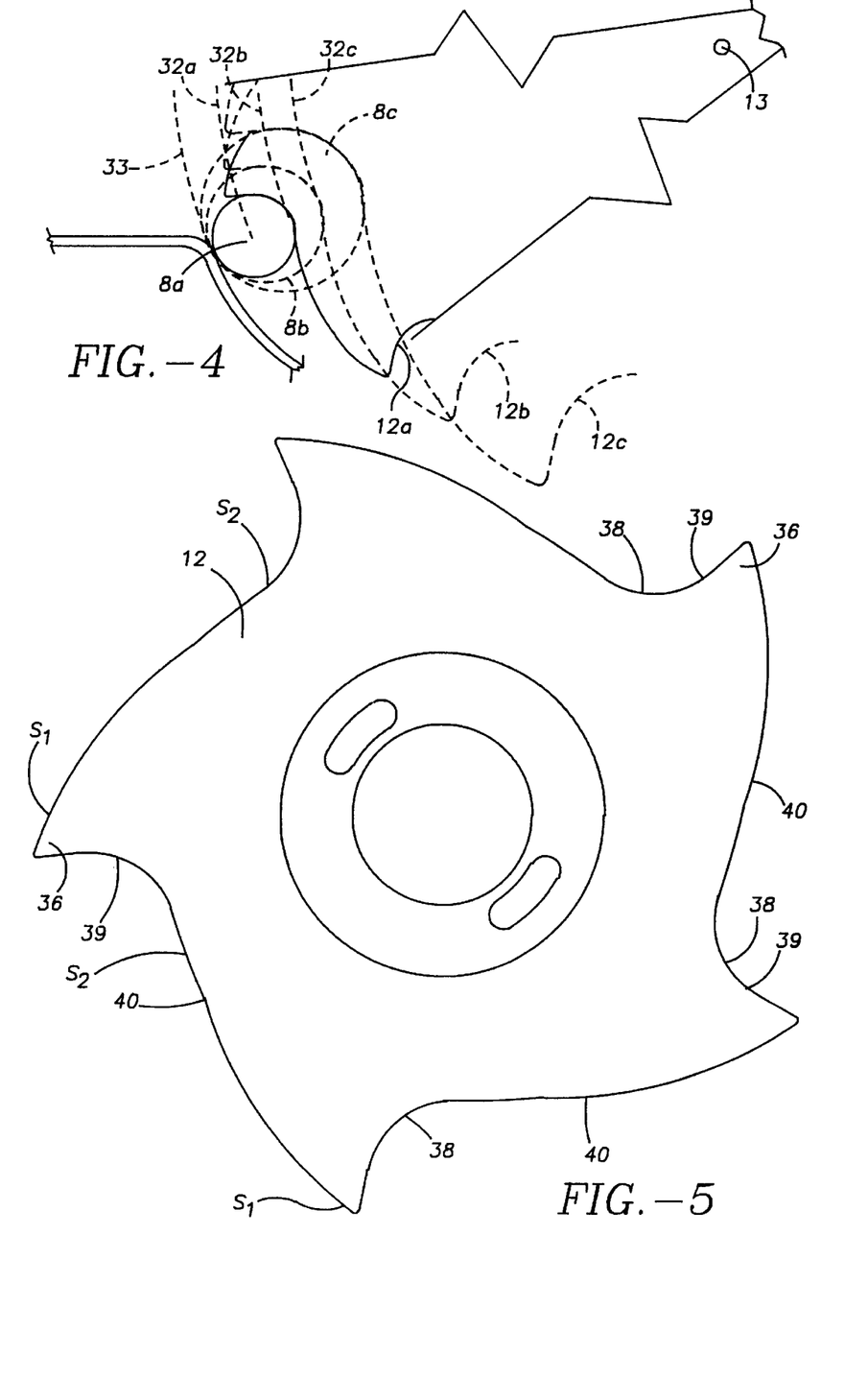
FIG. 4 is a diagrammatic view showing the feed apparatus for each of three different size containers.
FIG. 5 is a schematic, plan view of a feed apparatus in accordance with another embodiment of this invention.

FIG. 4 illustrates star wheels 12a, 12b, 12c of different diameters rotate about axis 13 for transporting articles 8a, 8b, 8c of different sized containers with the center axes of the containers moving along different pitch circles 32a, 32b, 32c, and a point on the exterior of the container opposite the star wheel moving along the same outer circle 33.

With other labeling machines employed in the field, the star wheel feed has a fixed pitch diameter. That is, the path of the center axis of the container as it is moved by the star wheel is fixed independent of the size of the container. When the machine is modified to accommodate different size containers, the star wheel feed as well as the infeed star, feed screw, vacuum drum, etc. must be replaced. Many of the replaced components, including the star wheel, must be repositioned to conform to the fixed pitch diameter and the entire machine must be recalibrated and retimed. As is known in the art, this process is quite labor intensive and time consuming, generally requiring one to two workers and two to four hours to complete. With the variable pitch diameter star 12 of this invention, the location of the components, particularly the star wheel 12, does not change. This significantly simplifies the adjustments required to use the machine with different sized containers. The entire machine of this invention may be converted to a different size feed by worker in a period of less than 20 minutes, significantly reducing machine down time.

It is to be understood the profile of the cam surface 40 for a given application is subject to considerable variation, from simple to complex, within the scope of this invention. For example, the cam surface 40 may include two or more sub-profiles designed to provide the first and second containers 8a and 8b with different motions. In the embodiment shown in FIG. 5, cam surface 40 includes two sub-profiles $S_1$, $S_2$. The first sub-profile $S_1$ is shaped to control the motion of the first container 8a to accelerate the container 8a into the pocket 39 while the second sub-profile controls the motion of the second container 8b without inducing the acceleration which is different from the motion of the first container 8a. Preferably, the second container 8b, as well as those containers upstream of the second container, are substantially isolated from the acceleration of the first container 8a. In addition to adding an acceleration component to the motion of the first container, the sub-profiles may also be designed to accommodate tolerance variations in the dimensions and/or cross-sectional shapes of the containers without altering the desired motion of the container 8n upstream of the infeed station. The shape of the sub-profiles of cam surface 40 may be determined by inserting the different parameters, such as the upper and lower tolerances for the container size or shape variations, into the above equation and superimposing the different cam profiles into a final profile having two or more sub-profiles designed to provide the desired motion of the first and second containers 8a and 8b at different stages during one interval of rotation of the star wheel 12.

The components of the final model equation for the star wheel of FIG. 5 are as follows:

$$C_D = 2R_c$$

$$\sigma = 2\frac{\pi}{5}$$

$$R(x,y) = x$$

$$F_1(x,y) = R_G\sin\delta + R_G - R_G\cos\delta$$

$$G[F_2(x,y)] = 2R_c - \sqrt{(2R_c)^2 - (\Delta y_1)^2}\ t$$

In the embodiment shown in FIGS. 1 and 2, the containers 8 are delivered at a constant velocity in a generally linear stream to a curved stretch immediately proceeding the infeed station 14. However, it is to be understood that in other applications of the invention the containers may travel through one or more curves before reaching the infeed station 14 introducing cyclic or harmonic accelerations to the stream of containers. If the cyclic or harmonic acceleration is of a duration less than or equal to the dimension $C_D$, this acceleration will not noticeably effect the average velocity or average acceleration of the container stream. However, this cyclic or harmonic acceleration offers the advantages of increasing flexibility in the handling of the containers, raises tolerance requirements, and allows for the handling of a greater range of container shapes and sizes.

The incorporation of a cyclic or harmonic acceleration into the motion of the containers upstream of the infeed station 14 may be expressed as follows:

$$R(x,y) = R[V(x,y) + A(x,y)]$$

with $$V(x,y) = \frac{dR(x,y)}{dt}$$

$$A(x,y) = \frac{dV(x,y)}{dt}$$

where V(x,y) represents the velocity of the container, A(x,y) represents the acceleration of the container and "t" is the time over which a container 8n travels the distance $C_D$. A(x,y) and V(x,y) are design constraints, and are therefore known components of the above equation.

The addition of one or more curves introduces different paths of travel F(x,y) which must be incorporated into the model equation, with the motion of each equation being effected by the motion of the previous containers. This may be represented as:

$$F_2(x_2,y_2) = F_1(x_1,y_1) + G[F_2(x_2,y_2)]$$
$$F_3(x_3,y_3) = F_1(x_1,y_1) + G[F_2(x_2,y_2)] + G[F_3(x_3,y_3)]$$
$$\vdots$$
$$F(x_n,y_n) = F(x_1,y_1) + \sum_{J=2}^{n-1} G[F(x_J,y_J)]$$

Thus, the motion of a container 8n is dependent upon the motion of the first container along a first path as defined by $F_1(x,y)$ and the motions of all containers between the first container 8a and the container 8n due to the geometric shapes of the container and the position and/or orientation of each container along the path $F_1(x,y)$.

The model equation for the profile of the cam surface 40, incorporating such cyclic or harmonic accelerations, is written as follows:

$$\frac{C_d}{\sigma} = F_1(x_1,y_1) + \sum_{J=2}^{N_1} (G[F_1(x_J,y_J)] + \sum_{I=2}^{M} \left( \sum_{J=2}^{N_1} G[F_I(x_J,y_J)] \right) + R[V(x,y_1) + A(x,y)] + S(x,y)$$

where:

$N_1$ is the total number of containers moving along the path$_1$F (x,y) over a given interval;

$N_f$ is the total number of containers moving along the path F (x,y) over a given interval; and M is the number of containers in front of the container 8n.

The profile of cam surface 40 required to produce the desired motion R(x,y) may be determined by solving the above equation directly or by numerical means. As mentioned above, under certain situations the resulting equation may be of such complexity that it becomes necessary to approximate the solution of the equation using suitable means.

It is apparent from the foregoing discussion that the star wheel 12 of the present invention may be used to separate adjacent containers or other articles and propel the first article from the infeed station to the exit station. The profile of the cam surface 40 is dependent upon a variety of factors, and may be calculated through mathematical analysis of the path traveled by the articles, the motion imparted on the articles and the size and cross-sectional shape of the articles. In addition, it is to be understood that means other than mathematical analysis may be used to arrive at the configuration of the star wheel, such as experimentation and the like. Although containers having circular and elliptical cross-sectional shapes are described in the specification, it is to be understood that a star wheel or feed apparatus for articles of any shapes may be employed within the scope of this invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An article handling machine comprising:
   a conveyor for supplying a stream of a plurality of articles to a first station with a first one of said articles positioned in front of and in physical contact with a second one of said articles and said second one of said articles positioned in physical contact with a third one of said articles, and a rotary feed apparatus for individually moving said articles from said first station to a second station downstream of said first station, said feed apparatus having at least one pocket shaped to at least partially receive one of said articles for transport of said one of said articles from said first station to said second station along a tangential path relative to said feed apparatus and a guide section configured to separate said first one of said articles from said second one of said articles and move said first one of said articles along a generally tangential path and into said pocket, to control movement of said second one of said articles during separation of said first one of said articles from said second one of said articles, and to move said second one of said articles along a generally tangential path and into said pocket upon further rotation of said feed apparatus.

2. The article handling machine of claim 1 in which said feed apparatus has a plurality of circumferentially spaced contoured arms each having a leading edge and a trailing edge, said leading edge defining said pocket and said trailing edge defining said guide section with said trailing edge of each of said contoured arms being shaped to separate said first one of said articles from said second one of said articles and move said first one of said articles along a generally tangential path and into said pocket of one of said contoured arms, control movement of said second one of said articles during separation of said first one of said articles from said second one of said articles, and move said second one of said articles along a generally tangential path and into said pocket of an adjacent one of said contoured arms.

3. The article handling machine of claim 2 in which said trailing edge of said one of said contoured arms is shaped to move said third one of said articles into contact with said trailing edge of said adjacent one of said contoured arms when said second one of said articles is moved into said pocket of said adjacent one of said contoured arms.

4. The article handling machine of claim 1 in which said guide section is shaped to impart a predetermined motion on said second one of said articles during movement of said first one of said articles into said pocket and, upon further rotation of said feed apparatus, during movement of said second one of said articles into said pocket.

5. The article handling machine of claim 1 in which said feed apparatus is mounted for rotation about a central feed axis for movement of the center axis of said articles along a first pitch diameter and a point defined by the exterior of said articles directly opposite said feed apparatus moving along an outer circle, and further comprising a second rotary feed apparatus replacing the first-mentioned feed apparatus for transporting a plurality of second articles from said first station to said second station, said second articles having a different cross-sectional size than the first-mentioned articles, said second feed apparatus having at least one pocket shaped to receive one of said second articles for movement of said one of said second articles from said first station to said second station, said second feed apparatus being mounted for rotation about said central feed axis for movement of the center axis of said second articles along a second pitch diameter different from said first pitch diameter and movement of a point defined by the exterior of said second articles opposite said second rotary feed apparatus moving along said outer circle.

6. The article handling machine of claim 1, and further comprising a segment application device for applying a segment of material to said articles.

7. The article handling machine of claim 6 in which said segment application device is positioned to apply said segment to said articles as said articles are individually moved from said first station to said second station by said feed apparatus.

8. The article handling machine of claim 6 in which said conveyor supplies a stream of containers to said first station and said segment application device is a label applying apparatus for applying labels to said containers.

9. The article handling machine of claim 1, and further comprising a second rotary feed apparatus spaced vertically above the first-mentioned feed apparatus, the first-mentioned feed apparatus and said second feed apparatus simultaneously engaging said one of said articles to move said one of said articles from said first station to said second station.

10. The article handling machine of claim 1 in which said guide section is shaped to produce a predetermined movement of said second one of said articles relative to said first one of said articles as said first one of said articles is moved tangentially into said pocket, the predetermined movement of said second one of said articles moving said third one of said articles and a plurality of said articles upstream from said third one of said articles at a substantially uniform velocity.

11. A feed apparatus for transporting a plurality of articles between an infeed station and an exit station, said articles being delivered to said infeed station in a stream of articles in physical contact with adjacent articles and a first one of said articles being positioned in front of a second one of said articles, said feed apparatus comprising:

at least one rotary wheel having a plurality of contoured arms, each of said contoured arms having a leading surface defining a pocket shaped to partially receive one of said articles for transporting said one of said articles along a tangential path relative to said rotary wheel from said infeed station to said exit station, said contoured arms each having a cam surface, said cam surface of one of said contoured arms being shaped to separate said second one of said articles from said first one of said articles and move said first one of said articles along a tangential path and into said pocket of said one of said contoured arms and, upon further rotation of said wheel, to move said second one of said articles along a tangential path and guide said second one of said articles into said pocket defined by said leading surface of an adjacent one of said contoured arms such that said articles are moving at a tangential velocity when said articles are seated in said pockets.

12. The feed apparatus of claim 11 in which said cam surface of said one of said contoured arms is shaped to move a third one of said articles into contact with said cam surface of said adjacent one of said contoured arms when said second one of said articles is moved into said pocket of said adjacent one of said contoured arms.

13. The feed apparatus of claim 11 in which said cam surface is shaped to impart a predetermined motion on said second one of said articles during movement of said first one of said articles into said pocket of said one of said contoured arms and, upon further rotation of said feed apparatus, during movement of said second one of said articles into said pocket of said adjacent one of said contoured arms.

14. The feed apparatus of claim 11 in which said feed apparatus is mounted for rotation about a central feed axis for movement of the center axis of said articles along a first pitch diameter and a point defined by the exterior of said articles directly opposite said feed apparatus moving along an outer circle, and further comprising a second rotary feed apparatus replacing the first-mentioned feed apparatus for transporting a plurality of second articles from said first station to said second station, said second articles having a different cross-sectional size than the first-mentioned articles, said second feed apparatus having at least one pocket shaped to receive one of said second articles for movement of said one of said second articles from said first station to said second station, said second feed apparatus being mounted for rotation about said central feed axis for movement of the center axis of said second articles along a second pitch diameter different from said first pitch diameter and movement of a point defined by the exterior of said second articles opposite said second rotary feed apparatus moving along said outer circle.

15. The feed apparatus of claim 11, and further comprising a segment application device for applying a segment of material to said articles.

16. An article feed for transporting articles from an entry point to an exit point, such articles being supplied to the entry point in the form of a succession of articles arranged in physical contact with one another, said article feed being mounted to rotate about a central axis and having a periphery formed with at least one pocket for receiving one such article and holding said article while said article is transported from said entry point to said exit point, said periphery also being formed with a guide section which functions, as the article feed rotates about said central axis, to contact the immediately adjacent article in said succession of articles, to thereafter guide such adjacent article along a path generally tangential to said periphery and into said pocket and to prevent entry of the next adjacent article into the same pocket.

17. The article feed of claim 16 in which said periphery of said article feed is formed with a plurality of said pockets and a separate guide section associated with each of said pockets.

18. The article feed of claim 16 in which said article feed moves the center axis of said articles along a first pitch diameter as the articles are transported from said entry point to said exit point and a point defined by the exterior of the articles directly opposite said article feed moving along an outer circle, and further comprising a second article feed replacing the first-mentioned article feed for transporting a plurality of second articles from said entry point to said exit point, said second articles having a different cross-sectional size than the first-mentioned articles, said second article feed having at least one pocket shaped to receive one of said second articles for movement of said one of said second articles from said entry point to said exit point, said second article feed being mounted for rotation about said central axis for movement of the center axis of said second articles along a second pitch diameter different from said first pitch diameter and movement of a point defined by the exterior of said second articles opposite said second article feed moving along said outer circle.

19. A method of handling a plurality of articles comprising the steps of:

moving a plurality of articles to an infeed station in a substantially continuous stream with a first article reaching said first station being positioned in front of and in physical contact with a second article and said second article being positioned in physical contact with a third article;

rotating a feed apparatus to separate said first article from said second article and transport said first article from said first station to said second station, said feed apparatus including at least one pocket shaped to receive one of said articles for transport of said one of said articles from said first station to a second station and a guide section configured to separate said first article from said second article and move said first article along a path tangential to said feed apparatus and into said pocket, to control movement of said second article during separation of said first article from said second article, and to move said second article along a path tangential to said feed apparatus and into said pocket upon further rotation of said feed apparatus.

20. The method of handling a plurality of articles of claim 19 in which said step of rotating said feed apparatus includes rotating a feed apparatus having a plurality of contoured arms having a leading edge defining said pocket and a trailing edge defining said guide section.

21. The method of handling a plurality of articles of claim 20 and, after rotating said feed apparatus to move said first article into said pocket of one of said contoured arms, rotating said feed apparatus to move said second container along a path tangential to said feed apparatus and into said pocket of an adjacent one of said contoured arms with said trailing edge of said adjacent one of said contoured arms separating said second article from said third article, and controlling movement of said third article during separation of said second article from said third article, and moving said third article along a path tangential to said feed apparatus and into said pocket of the next adjacent one of said contoured arms upon further rotation of said feed apparatus.

22. The method of handling a plurality of articles of claim 19 in which said feed apparatus is mounted for rotation about a central feed axis for movement of the center axis of said articles along a first pitch diameter and a point defined by the exterior of the articles directly opposite said article feed moving along an outer circle, and in which said step of moving a plurality of articles includes moving a plurality of additional articles to said infeed station, said additional articles having a different cross-sectional size than the first-mentioned articles, and further comprising the step of replacing the first-mentioned feed apparatus with a second feed apparatus for separating a first one of said additional articles from a second one of said additional articles and moving said first one of said additional articles from said infeed station to said exit station, said second feed apparatus being mounted for rotation about said central feed axis for movement of the center axis of said additional articles along a second pitch diameter different from said first pitch diameter and movement of a point defined by the exterior of said additional articles opposite said second feed apparatus moving along said outer circle.

23. The method of handling a plurality of articles of claim 19 in which said step of moving a plurality of articles includes moving a plurality of containers to said infeed station.

24. The method of handling a plurality of articles of claim 19, and further comprising the step of applying a segment of material to said exterior surface of each of said articles.

25. The method of handling a plurality of articles of claim 24 in which said step of moving a plurality of articles includes moving a plurality of containers to said infeed station, and in which said step of applying a segment of material includes applying labels to said containers.

* * * * *